United States Patent
Menon et al.

(10) Patent No.: US 9,355,240 B2
(45) Date of Patent: May 31, 2016

(54) MULTI-DEVICE SINGLE NETWORK SIGN-ON

(71) Applicant: Avaya Inc., Basking Ridge, NJ (US)

(72) Inventors: Sunil Menon, Los Gatos, CA (US); Shailesh Patel, San Jose, CA (US)

(73) Assignee: Avaya Inc., Santa Clara, CA (US)

( * ) Notice: Subject to any disclaimer, the term of this patent is extended or adjusted under 35 U.S.C. 154(b) by 309 days.

(21) Appl. No.: 13/929,750

(22) Filed: Jun. 27, 2013

(65) Prior Publication Data

US 2015/0007298 A1    Jan. 1, 2015

(51) Int. Cl.
*G06F 7/04* (2006.01)
*G06F 21/41* (2013.01)
*G06F 21/35* (2013.01)

(52) U.S. Cl.
CPC ............... *G06F 21/41* (2013.01); *G06F 21/35* (2013.01)

(58) Field of Classification Search
CPC ............................. G06F 21/30; G06F 21/305
USPC ............................................. 726/2–21, 26–30
See application file for complete search history.

(56) References Cited

U.S. PATENT DOCUMENTS

| | | | | |
|---|---|---|---|---|
| 2006/0069915 A1* | 3/2006 | Koeda | ................... | G06F 21/629 713/168 |
| 2008/0042912 A1* | 2/2008 | Lee | ..................... | H04L 12/4641 343/713 |
| 2010/0229216 A1* | 9/2010 | Koga | .................... | H04W 12/06 726/3 |
| 2011/0030037 A1* | 2/2011 | Olshansky | .......... | H04L 12/4641 726/4 |
| 2011/0030044 A1* | 2/2011 | Kranendonk | ....... | H04L 63/0815 726/8 |
| 2011/0223885 A1* | 9/2011 | Salkintzis | ......... | H04W 36/0016 455/411 |
| 2012/0144462 A1* | 6/2012 | Pochop, Jr. | ........... | H04L 63/062 726/6 |
| 2013/0272164 A1* | 10/2013 | Leonardos | ............ | H04W 12/04 370/254 |
| 2014/0140331 A1* | 5/2014 | Lee | ........................ | H04L 63/10 370/338 |
| 2014/0173695 A1* | 6/2014 | Valdivia | .................. | G06F 21/36 726/4 |

OTHER PUBLICATIONS

Soares et al., "Secure user authentication in cloud computing management interfaces," Performance Computing and Communications Conference (IPCCC), 2013 IEEE 32nd International Year: 2013 pp. 1-2.*
Thomas et al., "Perimeter security-towards 2000 and beyond," Security and Detection, 1995., European Convention on Year: 1995 pp. 172-175.*

* cited by examiner

*Primary Examiner* — Roderick Tolentino

(57) ABSTRACT

Methods, systems and computer readable media for multi-device single network sign-on are described. For example, a method can include authenticating a first device for network access via a first authentication process, the first device being associated with a user account. The method can also include receiving an access request from a second device associated with the user account, and determining whether the second device is within an access perimeter of the first device. The method can further include permitting the second device to access the network without a second authentication process when the second device is within the access perimeter of the first device.

17 Claims, 5 Drawing Sheets

MULTI-DEVICE SINGLE NETWORK SIGN-ON

TECHNICAL FIELD

Embodiments relate generally to computer networks, and more particularly, to methods, systems and computer readable media for multi-device single network sign-on.

BACKGROUND

Computer network users may increasingly access computer networks using a plurality of devices throughout a day. For example a user may use a desktop computer, a laptop computer a tablet computing device and/or a wireless phone to access a computer network. Conventional networks may require the user to sign-in (or perform an authentication process) for each device being used.

A need may exist to reduce the burden on users accessing a network with multiple devices by permitting multi-device single network sign-on. However, network security can be a consideration when permitting a user device to access a network without requiring user authentication.

Embodiments were conceived in light of the above mentioned needs, problems and/or limitations, among other things.

SUMMARY

One or more embodiments can include methods, systems and computer readable media for multi-device single network sign-on. In some implementations, the method can include authenticating a first device for network access via a first authentication process, the first device being associated with a user account. The method can also include receiving an access request from a second device associated with the user account, and determining whether the second device is within an access perimeter of the first device. The method can further include permitting the second device to access the network without a second authentication process when the second device is within the access perimeter of the first device.

The method can also include registering the second device from an authenticated log-in session of the first device so as to associate the second device with the user account. The method can further include registering a plurality of secondary devices from an authenticated log-in session of the first device so as to associate each of the secondary devices with the user account.

The access perimeter can be based on a distance from the first device. Alternatively, the access perimeter can be based on a network access point of the first device and a network access point of the second device.

The method can also include denying access to the second device when the second device is not within the access perimeter of the first device. The access perimeter can be configurable.

In some implementations, the second device can be permitted to access the network when the second device is within the access perimeter of the first device and the first device is within the access perimeter.

Some implementations can include a system comprising one or more processors configured to perform operations. The operations can include authenticating a first device for network access via a first authentication process, the first device being associated with a user account and receiving an access request from a second device associated with the user account. The operations can also include determining whether the second device is within an access perimeter of the first device. The operations can further include when the second device is within the access perimeter of the first device, permitting the second device to access the network without a second authentication process.

The operations can also include registering the second device from an authenticated log-in session of the first device so as to associate the second device with the user account. The operations can further include registering a plurality of secondary devices from an authenticated log-in session of the first device so as to associate each of the secondary devices with the user account.

The access perimeter can be based on a distance from the first device. The access perimeter can be based on a network access point of the first device and a network access point of the second device.

The operations can also include denying access to the second device when the second device is not within the access perimeter of the first device. The access perimeter can be configurable. The second device can be permitted to access the network when the second device is within the access perimeter of the first device and the first device is within the access perimeter.

Some implementations can include a nontransitory computer readable medium having stored thereon software instructions that, when executed by a processor of a wireless controller, cause the processor to perform operations. The operations can include authenticating a first device for network access via a first authentication process, the first device being associated with a user account and receiving an access request from a second device associated with the user account. The operations can also include determining whether the second device is within an access perimeter of the first device and, when the second device is within the access perimeter of the first device, permitting the second device to access the network without a second authentication process.

The access perimeter can be based on a distance from the first device. The access perimeter can be configurable. The second device can be permitted to access the network when the second device is within the access perimeter of the first device and the first device is within the access perimeter.

DETAILED DESCRIPTION

Figure 1:
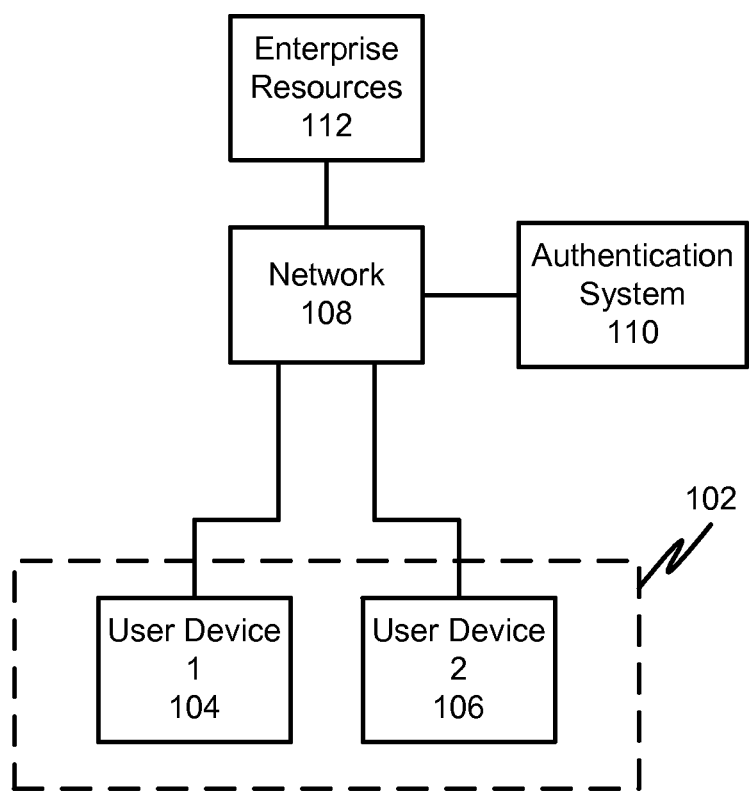
FIG. 1 is a diagram of an example network in accordance with at least one implementation.

FIG. 1 is a diagram of an example network environment 100 that includes a group of devices 102 associated with a user account. The group includes a first device 104 and a second device 106. The environment 100 also includes a network 108 coupled to an authentication system 110 and one or more enterprise resources 110.

In operation, a user can authenticate via a first device (e.g., 104) to the authentication system 110. Once authenticated, the user can access the network 108 and the enterprise resources 112. The user can also register a second device (e.g., 106) and can access the network 108 and enterprise resources from the second device without having to authenticate when the second device is within an access perimeter.

The access perimeter can be configurable and can include a distance between the two devices and/or comprise location information based on network access points (e.g., accessing the network via the second device from within the same facility, on the same floor, or in the same general vicinity as the first device). The access perimeter can help ensure that the second device is being used by the user (or with the user's knowledge and/or consent). The access perimeter can help ensure network security when permitting a user to access the network from the second device without authentication (e.g., sign-on or log-on).

Figure 2:
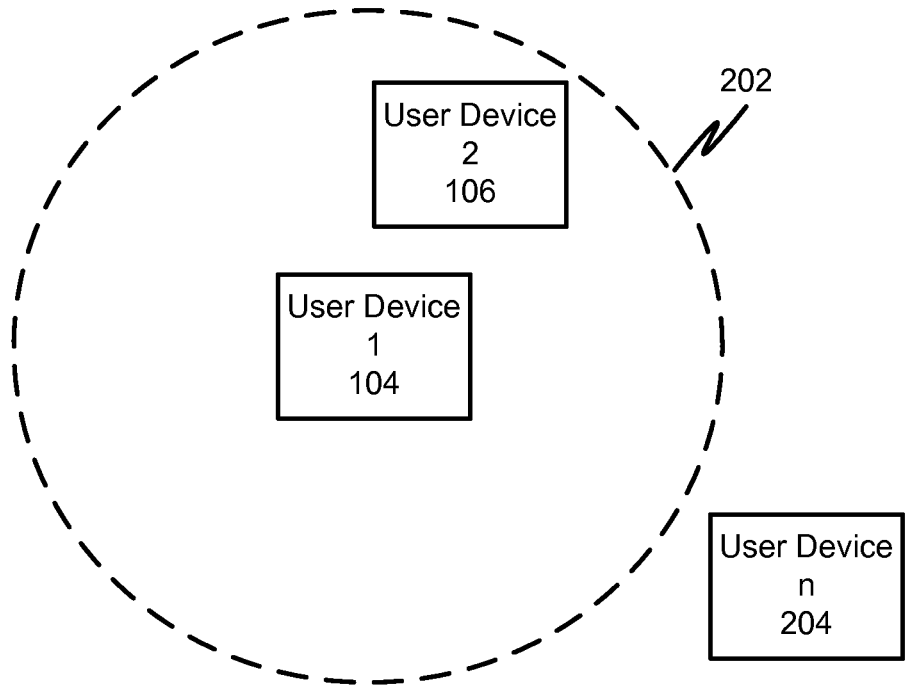
FIG. 2 is a diagram of an example access perimeter in accordance with at least one implementation.

FIG. 2 is a diagram of an example access perimeter in accordance with at least one implementation. FIG. 2 shows a first user device 104 and a second user device 106 within the access perimeter 202. A third device 204 is located outside the access perimeter 202.

In operation, when the user is authenticated (e.g., signs on or logs on) via the first device 104, the user can access the network via the second device 106 without further authentication because the second device is within the access perimeter 202. However, the user could not access the network from the third device 204 without authentication because the third device is outside the access perimeter 202.

Figure 3:
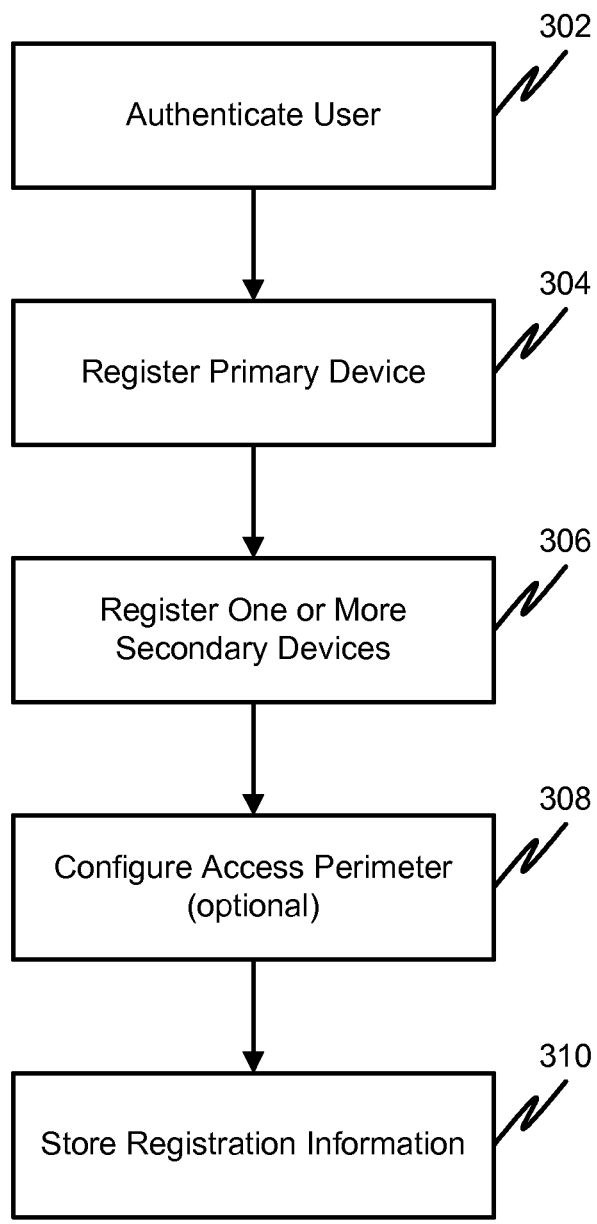
FIG. 3 is a flow chart of an example method for multi-device single network sign-on in accordance with at least one implementation.

FIG. 3 is a flow chart of an example method for multi-device single network sign-on. Processing begins at 302, where a user is authenticated (e.g., signs on or logs on) by an authentication system (e.g., 110). Processing continues to 304.

At 304, the user can register a primary device used to access the network and/or other resources. The registration can include obtaining identification information for the device such as a MAC address or other identification information. Processing continues to 306.

At 306, the user can register one or more secondary devices used to access the network and/or other resources. The registration can include obtaining identification information for the device such as a MAC address or other identification information. Processing continues to 308.

At 308, the access perimeter can be optionally configured. The access perimeter can include a distance from the primary device that a secondary device must be within in order to access the network without authentication. Also, the perimeter can include defining network access points that the secondary devices must be connected to when the primary device is connected to a given network or access point. The perimeter may be configured on a per-user and/or per-device basis by the user and/or by a network administrator. Processing continues to 310.

At 310, the device registration (and perimeter configuration) information is stored. It will be appreciated that 302-310 can be repeated in whole or in part.

Figure 4:
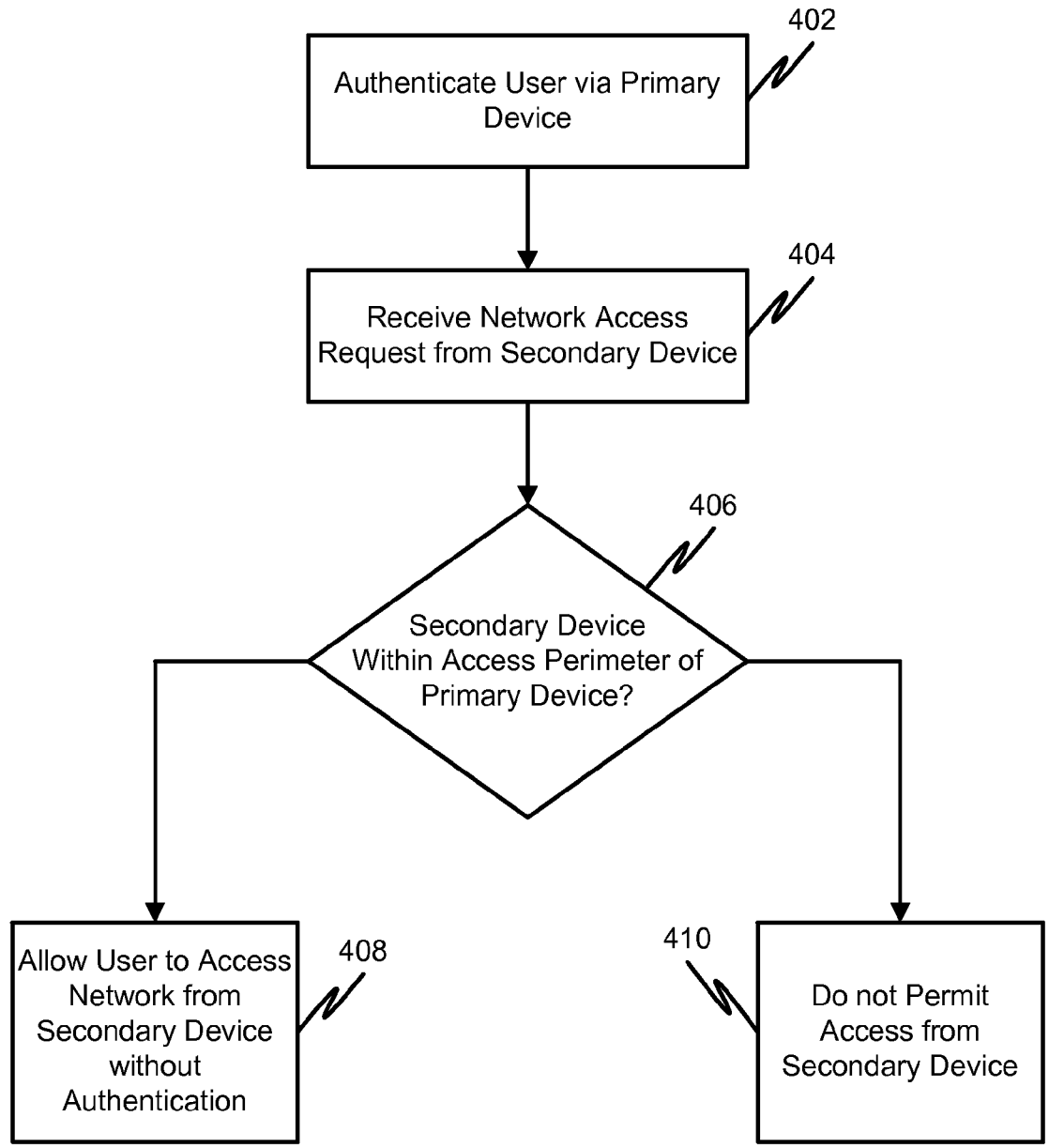
FIG. 4 is a flow chart of an example method for multi-device single network sign-on in accordance with at least one implementation.

FIG. 4 is a flow chart of an example method for multi-device single network sign-on. Processing begins at 402, where a user is authenticated via a primary device (e.g., 104). Processing continues to 404.

At 404, a network access request is received (e.g., at network 108 or authentication system 110) from a secondary device (e.g., 106). Processing continues to 406.

At 406, the system (e.g., 110) determines whether the secondary device is within the access perimeter defined for the primary device of the user. If so, processing continues to 408. If not, processing continues to 410.

At 408, the user is permitted to access the network from the secondary device without authentication on the secondary device.

At 410, the user is not permitted to access the network from the secondary device without further authentication. It will be appreciated that 402-410 can be repeated in whole or in part.

Figure 5:
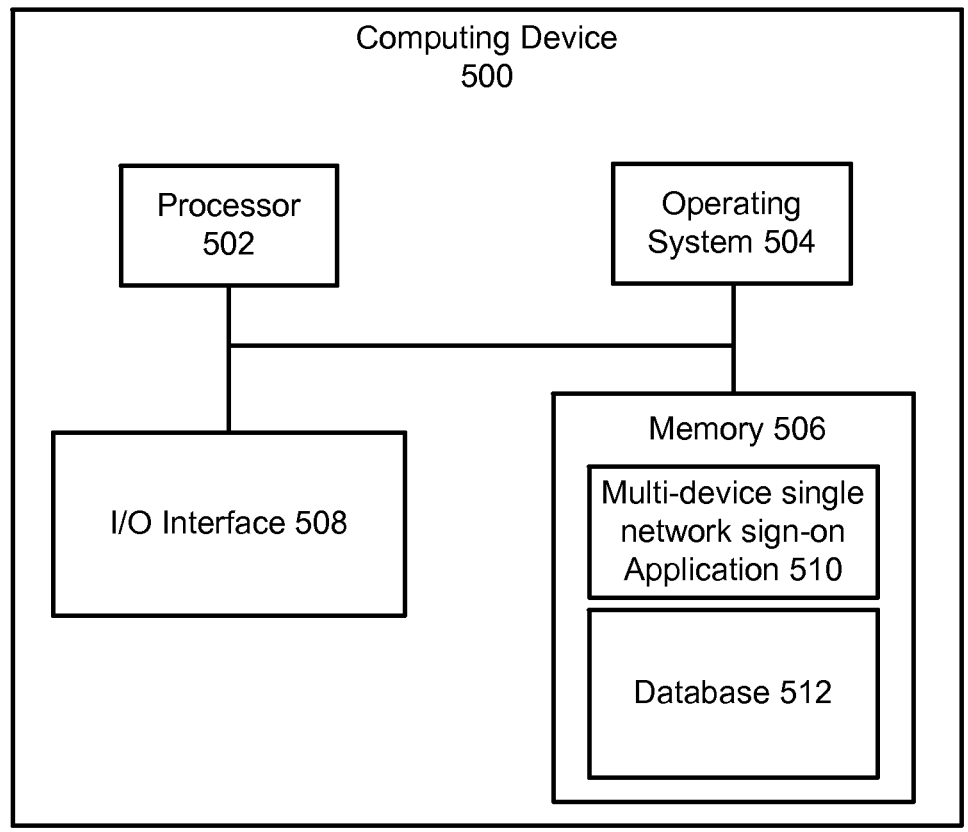
FIG. 5 is a diagram of an example computer system for multi-device single network sign-on in accordance with at least one implementation.

FIG. 5 is a diagram of an example computer system 500 in accordance with at least one implementation. The computer 500 includes a processor 502, operating system 504, memory 506 and I/O interface 508. The memory 506 can include a multi-device single network sign-on application 510 and a database 512 (e.g., for storing information regarding registered secondary devices, perimeter configurations, or the like).

In operation, the processor 502 may execute the application 510 stored in the memory 506. The application 510 can include software instructions that, when executed by the processor, cause the processor to perform operations for multi-device single network sign-on in accordance with the present disclosure (e.g., performing one or more of steps 302-310 and/or 402-410).

The application program 510 can operate in conjunction with the database 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for multi-device single network sign-on.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method comprising:
   authenticating, by one or more hardware processors, a first device for network access via a first authentication process, the first device being associated with a user account, wherein the first device is connected to a first network;
   receiving, by the one or more hardware processors, an access request from a second device associated with the user account, wherein the second device is connected to a second network access point;
   determining, by the one or hardware more processors, whether the second device is within an access perimeter of the first device, wherein the determining comprises: defining one or more network access points based on the first network; determining that the second device is within the access perimeter of the first device when the second network access point is in the defined one or more network access;
   when the second device is within the access perimeter of the first device, permitting by the one or more hardware processors, the second device to access the network without a second authentication process; and
   wherein the second device is permitted to access the network when the second device is within the access perimeter of the first device and the first device is within the access perimeter.

2. The method of claim 1, further comprising registering the second device from an authenticated log-in session of the first device so as to associate the second device with the user account.

3. The method of claim 2, further comprising registering a plurality of secondary devices from an authenticated log-in session of the first device so as to associate each of the secondary devices with the user account.

4. The method of claim 1, wherein the access perimeter is based on a distance from the first device.

5. The method of claim 1, wherein the access perimeter is based on a network access point of the first device and a network access point of the second device.

6. The method of claim 1, further comprising denying access to the second device when the second device is not within the access perimeter of the first device.

7. The method of claim 1, wherein the access perimeter is configurable.

8. A system comprising:
   one or more processors;
   a memory to store computer executable instructions to be executed by the one or more processors, configured to perform operations including:
   authenticating a first device for network access via a first authentication process, the first device being associated with a user account, wherein the first device is connected to a first network;
   receiving an access request from a second device associated with the user account,
   wherein the second device is connected to a second network access point;
   determining whether the second device is within an access perimeter of the first device: wherein the determining comprises:
   defining one or more network access points based on the first network; and determining that the second device is within the access perimeter of the first device when the second network access point is in the defined one or more network access;
   when the second device is within the access perimeter of the first device, permitting the second device to access the network without a second authentication process; and wherein the second device is permitted to access the network when the second device is within the access perimeter of the first device and the first device is within the access perimeter.

9. The system of claim 8, wherein the operations further comprise registering the second device from an authenticated log-in session of the first device so as to associate the second device with the user account.

10. The system of claim 9, wherein the operations further comprise registering a plurality of secondary devices from an authenticated log-in session of the first device so as to associate each of the secondary devices with the user account.

11. The system of claim 8, wherein the access perimeter is based on a distance from the first device.

12. The system of claim 8, wherein the access perimeter is based on a network access point of the first device and a network access point of the second device.

13. The system of claim 8, wherein the operations further comprise denying access to the second device when the second device is not within the access perimeter of the first device.

14. The system of claim 8, wherein the access perimeter is configurable.

15. A nontransitory computer readable medium having stored thereon software instructions that, when executed by a processor of a wireless controller, cause the processor to perform operations including:

authenticating a first device for network access via a first authentication process, the first device being associated with a user account, wherein the first device is connected to a first network;

receiving an access request from a second device associated with the user account, wherein the second device is connected to a second network access point;

determining whether the second device is within an access perimeter of the first device wherein the determining comprises:

defining one or more network access points based on the first network; and determining that the second device is within the access perimeter of the first device when the second network access point is in the defined one or more network access;

when the second device is within the access perimeter of the first device, permitting the second device to access the network without a second authentication process; and wherein the second device is permitted to access the network when the second device is within the access perimeter of the first device and the first device is within the access perimeter.

16. The nontransitory computer readable medium of claim 15, wherein the access perimeter is based on a distance from the first device.

17. The nontransitory computer readable medium of claim 15, wherein the access perimeter is configurable.

* * * * *